United States Patent

Ingall et al.

[11] Patent Number: 5,352,047
[45] Date of Patent: Oct. 4, 1994

[54] SNAP-TAB ROLLER BEARING CASE

[75] Inventors: Kirk L. Ingall, Clinton, Tenn.; John R. Marjancik, Brownsburg, Ind.

[73] Assignee: Rexnord Corporation, Milwaukee, Wis.

[21] Appl. No.: 912,548

[22] Filed: Jul. 13, 1992

[51] Int. Cl.$^5$ .......................... F16C 33/46; F16C 33/49
[52] U.S. Cl. ...................................... 384/572; 384/526; 384/576; 384/578
[58] Field of Search ................ 384/572, 576, 577, 578, 384/523, 526, 470

[56] References Cited

U.S. PATENT DOCUMENTS

| | | | |
|---|---|---|---|
| Re. 33,437 | 11/1990 | Sahlgren et al. | 384/574 |
| 1,513,999 | 11/1924 | Kifer . | |
| 2,848,791 | 8/1958 | Neese . | |
| 2,881,036 | 4/1959 | Neese . | |
| 2,977,164 | 3/1961 | Witte | 384/576 |
| 3,163,477 | 12/1964 | Schmidt . | |
| 3,298,761 | 1/1967 | Schaeffler . | |
| 3,307,892 | 3/1967 | Eckstein . | |
| 3,397,019 | 8/1968 | Day et al. | 384/526 |
| 3,442,562 | 5/1969 | Schaeffler et al. . | |
| 3,694,043 | 9/1972 | Tellson . | |
| 3,736,034 | 5/1973 | Molloy . | |
| 3,963,285 | 6/1976 | Kellstrom . | |
| 3,975,066 | 8/1976 | Hofmann et al. | 384/526 |
| 4,004,840 | 1/1977 | Johnston et al. . | |
| 4,054,340 | 10/1977 | Broshkevitch et al. . | |
| 4,066,304 | 1/1978 | Johnston et al. . | |
| 4,111,501 | 9/1978 | Johnston et al. . | |
| 4,149,760 | 4/1979 | Guenther . | |
| 4,153,309 | 5/1979 | Markfelder et al. | 384/576 |
| 4,278,307 | 7/1981 | Olschewski et al. . | |
| 4,324,444 | 4/1982 | Buczynski et al. . | |
| 4,328,999 | 5/1982 | Olschewski et al. . | |
| 4,387,939 | 6/1983 | Walter et al. . | |
| 4,391,476 | 7/1983 | Negele et al. . | |
| 4,397,507 | 8/1983 | Kraus et al. . | |
| 4,472,006 | 9/1984 | Goransson et al. . | |
| 4,557,614 | 12/1985 | Knappe | 384/573 |
| 4,586,833 | 5/1986 | Walter et al. | 384/531 |
| 4,623,270 | 11/1986 | Olschewski et al. | 384/576 |
| 4,699,529 | 10/1987 | Scholl et al. | 384/560 |
| 4,710,039 | 12/1987 | Huttner | 384/574 |
| 4,767,224 | 8/1988 | Bauer et al. | 384/572 |
| 4,776,707 | 10/1988 | Olschewski et al. | 384/51 |
| 4,824,265 | 4/1989 | Hofmann et al. | 384/560 |
| 4,837,909 | 6/1989 | Schalk . | |
| 4,961,651 | 10/1990 | Rabe | 384/51 |
| 5,009,525 | 4/1991 | Brockmüller et al. | 384/576 |

FOREIGN PATENT DOCUMENTS

| | | |
|---|---|---|
| 1008965 | 5/1957 | Fed. Rep. of Germany . |
| 1286829 | 1/1969 | Fed. Rep. of Germany ...... 384/576 |
| 140047 | 10/1979 | Japan .................................. 384/576 |

*Primary Examiner*—Thomas R. Hannon
*Attorney, Agent, or Firm*—Michael, Best & Friedrich

[57] ABSTRACT

An anti-friction bearing assembly including coaxial inner and outer bearing race members, a plurality of cylindrical roller bearing elements between the inner and outer bearing race members, and a snap-in bearing cage for appropriately spacing the bearing elements apart. The bearing cage includes a pair of identically constructed, axially spaced apart bearing cage members each including an annular body portion, a plurality of axially extending and circumferentially spaced apart webs defining therebetween a plurality of bearing element receiving pockets, and a plurality of tab members each extending radially from one of the webs. The tab members are radially flexible to permit insertion of the corresponding cage member into the bearing assembly and thereafter snap back to an unflexed position to retain the corresponding bearing cage in the bearing assembly.

7 Claims, 3 Drawing Sheets

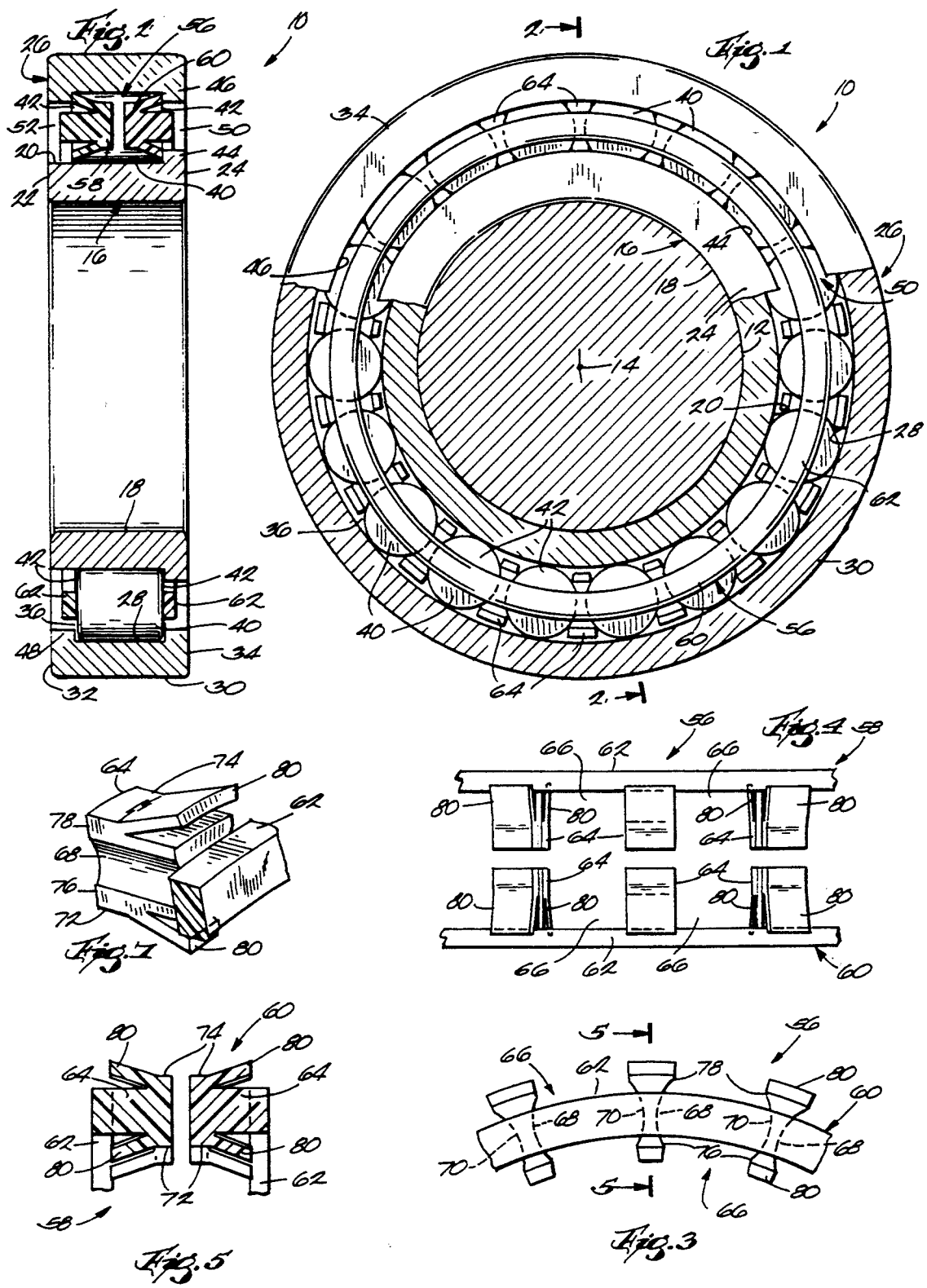

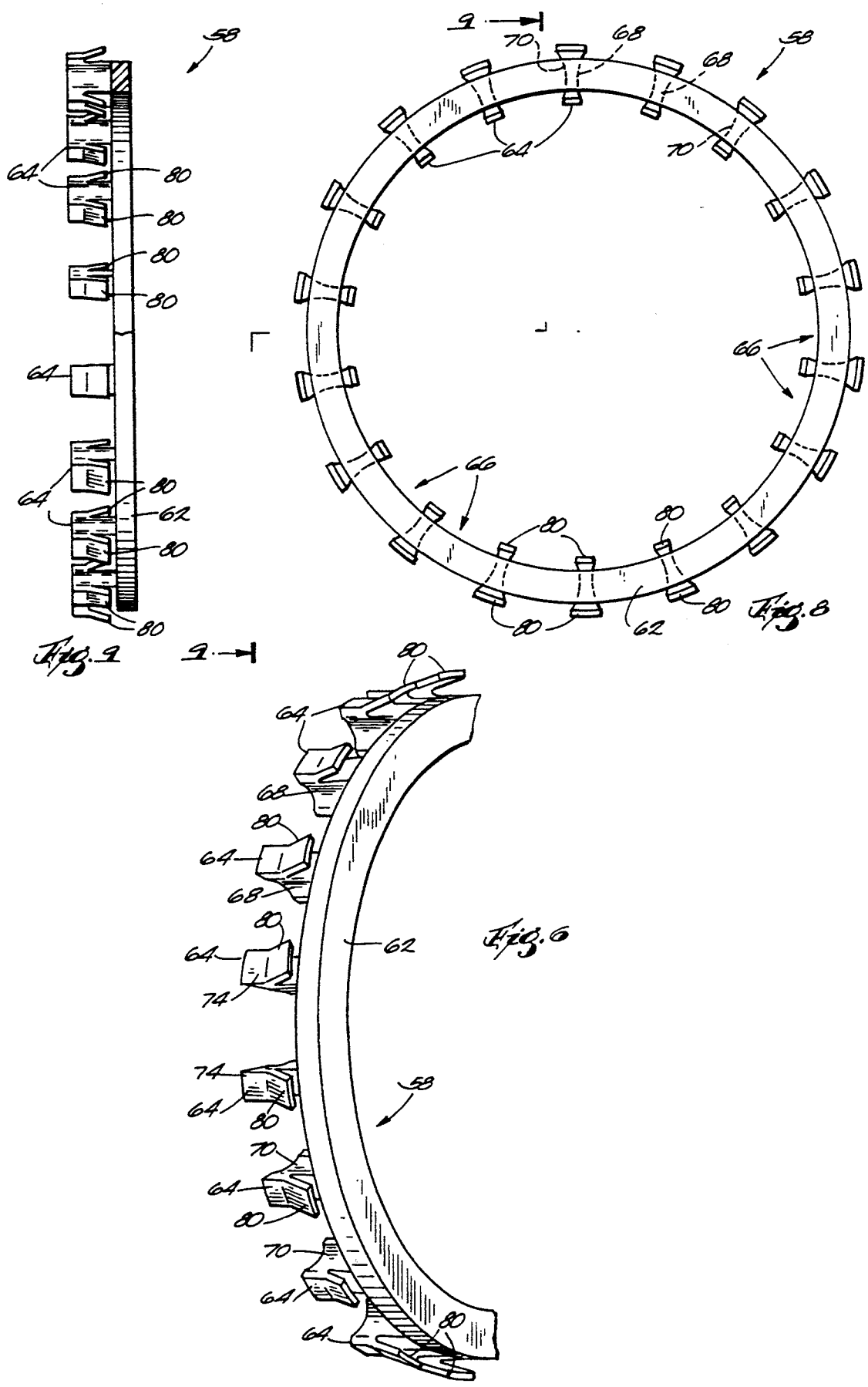

SNAP-TAB ROLLER BEARING CASE

BACKGROUND OF THE INVENTION

1. Field of the Invention

The invention relates to anti-friction roller bearing units, and more particularly to bearing cages which can be snapped into position to maintain appropriate spacing between the individual bearing elements.

2. Reference to Prior Art

Bearing cages are conventionally employed in roller bearing assemblies to maintain proper spacing between the individual bearing elements. Bearing cages in which individual bearing elements can be radially snapped into spaces defined between circumferentially spaced apart webs extending between axially spaced apart rings are generally known. U.S. Pat. No. 4,472,006 issued Sep. 18, 1984 to Goransson et al. provides an example of this type of bearing cage.

One-piece ball bearing cages which can be inserted axially into a ball bearing assembly are also known. In this type of bearing cage, ball receiving pockets spaced circumferentially around the cage open axially outwardly of a main cage body. Each of the pocket openings is defined between opposed, yieldable retention surfaces or fingers to facilitate snapping a ball into the pocket. After being snapped into one of the pockets, the ball is retained therein by the fingers. Examples of this type of bearing construction are shown in U.S. Pat. No. 4,324,444 issued Apr. 13, 1982 to Buczynski et al., U.S. Pat. No. 4,149,760 issued Apr. 17, 1979 to Guenther, and U.S. Pat. No. 4,278,307 issued Jul. 14, 1981 to Olschewski et al.

It is also known to provide a bearing cage including two pieces which are snapped together to form the cage. An example of a two-piece bearing cage construction is shown in U.S. Pat. No. 4,054,340 issued Oct. 18, 1977 to Broshkevitch et al. In this patent, the bearing cage includes a first piece which is a flat ring and a second piece having a ring portion with a plurality of circumferentially spaced and axially extending finger portions. The finger portions are provided with snap members at their ends that snap into holes in the first piece to secure the first and second pieces together.

SUMMARY OF THE INVENTION

The present invention provides an improved bearing retainer or cage arrangement which can be economically manufactured and which is designed to facilitate efficient snap-in installation in a bearing unit to appropriately space bearing elements. In one embodiment of the invention the bearing cage is of two-piece construction and the halves of the cage are axially insertable into the bearing unit from the opposite sides thereof. In other embodiments of the invention these bearing cage halves can be used individually as one-piece bearing cages. The bearing cage is suitable for use, without modification, in different bearing units that employ cylindrical roller bearing elements of different lengths. The bearing cage can also be used in bearing units including various means for retaining the bearing elements and/or the cage between the inner and outer bearing race members, such as for example, snap rings or axially spaced apart annular ribs or shoulders on the race members. Additionally, the snap-in bearing cage arrangement enables the use of easy and economical automated assembly methods to assemble finished bearing units.

More particularly, the invention provides an anti-friction bearing assembly for rotatably supporting a shaft. The bearing assembly includes an inner bearing race member adapted to surround and engage the shaft, the inner bearing race member including an annular inner race surface, and an outer bearing race member including an outer bearing race surface. The inner and outer bearing race surfaces define therebetween an annular raceway space. The bearing assembly also includes a pair of axially spaced apart shoulder members each associated with one of the inner and outer bearing race members and extending radially toward the other of the inner and outer bearing race members. The shoulder members at least partially define axially opposite annular end openings in the raceway space, the end openings being radially constricted relative to the raceway space. The bearing assembly also includes a plurality of bearing elements positioned within the raceway space and between the shoulder members, and a bearing cage including first and second cage members each axially insertable into the raceway space through one of the end openings. The first and second cage members cooperate with each other to maintain the bearing elements in circumferentially spaced apart relation to one another. Each of the first and second cage members includes an annular body portion and a plurality of axially extending webs spaced circumferentially around the body portion. The webs define therebetween pockets for receiving the bearing elements and each of the webs includes a radially extending tab member. Each of the tab members is radially flexible between a first position and a second position. In the first position the tab member, when the corresponding cage member is operatively positioned within the raceway space, is engageable with one of the shoulder members to prevent removal of the corresponding cage member from the raceway space. In the second position, the tab member is flexed radially inwardly from the first position toward the associated web to permit insertion of the corresponding cage member through one of the annular end openings in the raceway space.

The invention also provides a snap-in bearing cage apparatus for appropriately spacing the bearing elements of an anti-friction bearing assembly including inner and outer race members defining therebetween a raceway space having opposite radially constricted annular end openings. The bearing cage apparatus includes a cage member having an annular body portion and a plurality of webs extending axially from the body portion and being spaced circumferentially around the body portion. The webs define therebetween bearing element receiving pockets. The bearing cage apparatus also includes a plurality of tab members each extending radially from an associated one of the webs on the cage member. Each of the tab members is radially flexible between a first position in which the tab member is adapted to engage one of the inner and outer race members to retain the cage member in the bearing cage apparatus, and a second position flexed inwardly from the first position toward the associated web. With the tab members in the second position, the cage member can be axially inserted into the raceway space through one of the annular end openings.

The invention further provides a method of assembling an anti-friction bearing assembly including an annular inner race member, an annular outer race member including axially spaced apart and radially inwardly extending shoulder members, a plurality of bearing elements, and a bearing cage including a pair of cage members which cooperate with each other to maintain the bearing elements in spaced relation. Each of the cage members includes an annular body portion, a plurality of axially extending webs spaced circumferentially around the body portion, and a plurality of radially extending tabs. The method of assembling these components begins by providing an assembly apparatus including a cam member having an outer surface including a cam surface portion, and a fixture member supported for rotation relative to the cam member, the fixture mender including a plurality of spaced apart pins positioned in a generally circular path. The next step in assembling the bearing assembly is to place the outer bearing race member on the fixture plate in coaxial relation around the circular path of pins so that the cam surface portion and the outer race member define therebetween a delivery space. Bearing elements are then delivered one at a time to the delivery space, and the fixture plate is rotated relative to the cam member so that the cam surface portion sequentially cams the sequentially delivered bearing elements into the spaces defined between the pins and between the shoulder members of the outer bearing race member. After the full complement of bearing elements have been cammed into position, one of the cage members is axially inserted between the outer surface of the cam member and the outer bearing race member such that the webs on the one cage member are positioned between the bearing elements. The partially assembled bearing assembly including the outer bearing race member, the bearing elements, and the one cage member is then removed from the assembly apparatus. The bearing assembly is then finished by axially inserting the webs of the other cage member between the bearing elements and positioning the inner bearing race member inside the outer bearing race member such that the bearing elements are positioned therebetween.

Other features and advantages of the invention will become apparent to those skilled in the art upon review of the following detailed description, claims and drawings.

BRIEF DESCRIPTION OF THE DRAWINGS

FIG. 1 is a partially broken away side elevational view of an anti-friction bearing unit shown supporting a shaft and embodying various features of the invention.

FIG. 2 is a partial sectional view of the bearing unit taken along line 2—2 in FIG. 1.

FIG. 3 is an enlarged side elevational view of a portion of the two-piece bearing cage used in the bearing unit illustrated in FIG. 1.

FIG. 4 is a top plan view of the bearing cage portion illustrated in FIG. 3.

FIG. 5 is a sectional view of the bearing cage portion taken along line 5—5 in FIG. 3.

FIG. 6 is an enlarged perspective view of a portion of one of the bearing cage members of the bearing cage illustrated in FIG. 1.

FIG. 7 is a further enlarged view of a portion of the cage member illustrated in FIG. 6.

FIG. 8 is a side elevational view of one of the bearing cage members of the two-piece bearing cage illustrated in FIG. 1.

FIG. 9 is a view taken along line 9—9 in FIG. 8.

Figure 10:
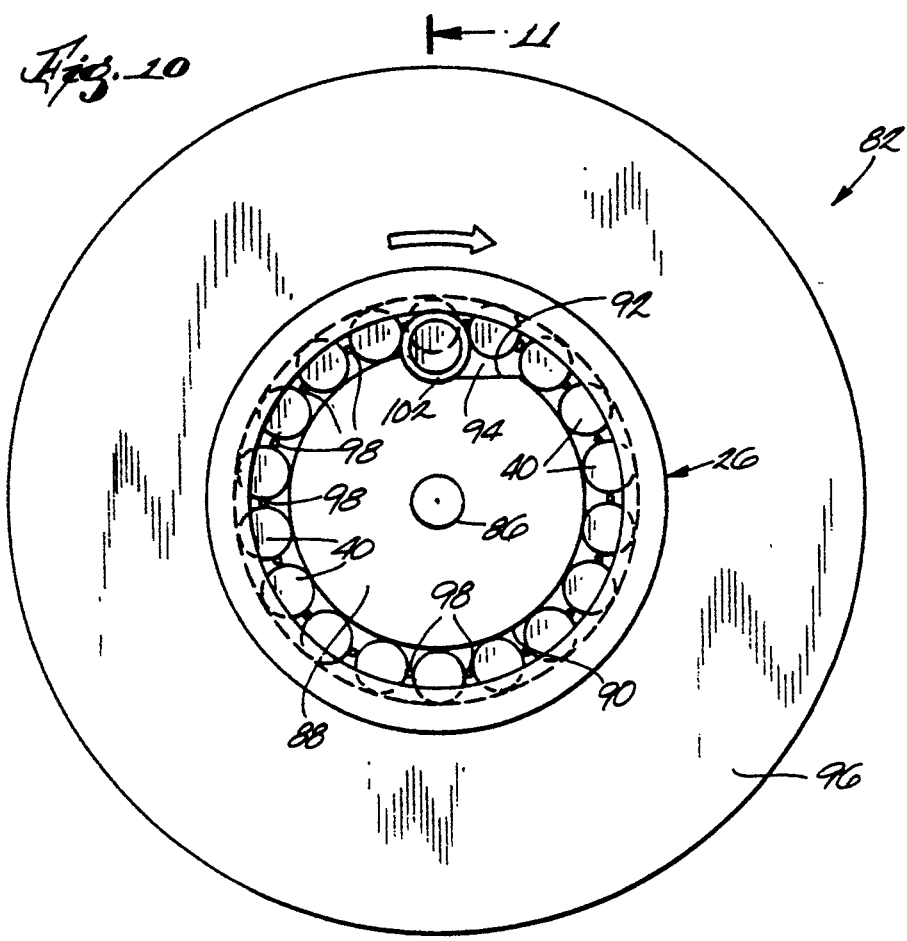
FIG. 10 is a top elevational view of an apparatus for assembling the bearing unit illustrated in FIG. 1, the apparatus being shown with a partially assembled bearing unit.

Before one embodiment of the invention is explained in detail, it is to be understood that the invention is not limited in its application to the details of the construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

GENERAL DESCRIPTION

Illustrated in the drawings is an anti-friction bearing unit 10 embodying various features of the invention. The bearing unit 10 is preferably employed to support a cylindrical shaft 12 (shown in section in FIG. 1) for rotation about its axis 14.

As shown in FIGS. 1 and 2, the bearing unit 10 includes a bearing support structure including an annular inner bearing race member 16. The inner race member 16 includes an inner circumferential side 18 engageable with the shaft 12, an outer circumferential side forming an annular inner race surface 20 and opposite radially extending end faces 22 and 24. The bearing support structure also includes an annular outer bearing race member 26 positioned coaxially around the inner race member 16. The outer bearing race member 26 includes an inner circumferential side forming an outer annular race surface 28, an outer circumferential side 30 preferably engageable with a housing (not shown) or other suitable bearing unit support structure, and opposite radial end faces 32 and 34. The inner and outer race surfaces 20 and 28 of the respective inner and outer race members 16 and 26 define therebetween an annular raceway space 36.

The bearing unit 10 also includes a plurality of roller bearing elements 40 positioned between the inner and outer race surfaces 20 and 28. While the bearing elements 40 can be variously configured, in the illustrated arrangement the bearing elements 40 are cylindrical roller bearings including axially spaced end faces 42.

To retain the bearing elements 40 in position between the inner and outer race members 16 and 26, the bearing unit 10 is provided with means for restricting axial movement of the bearing elements 40. In the illustrated arrangement, axial movement of the bearing elements 40 is restricted by ribs or shoulders associated with the inner and outer race members 16 and 26. In particular, the inner race member 16 includes an integrally formed shoulder 44 extending radially outwardly from the inner race surface 20. The outer race member 26 is also provided with a pair of axially spaced apart and integrally formed shoulders 46 and 48 extending radially inwardly from the outer race surface 28. The shoulders 44, 46 and 48 also serve to define axially spaced apart opposite end openings 50 and 52 in the raceway space 36. The opposite openings 50 and 52 are generally annular and are radially constricted relative to the raceway space 36.

As understood with reference to FIG. 2, the shoulder arrangement permits the inner race member 16 to slide to the left relative to the remainder of the bearing unit 10 to permit assembly of the bearing unit 10, and to slide to the right to allow disassembly of the unit 10, if desired. Thus, in arrangements employing the bearing unit 10 illustrated in the drawings, it is preferable to use means (not shown) to limit axial movement of the race members 16 and 26 relative to one another.

While in the illustrated arrangement the means for restricting axial movement of the bearing elements 40 includes shoulders 44, 46 and 48 formed integrally with the inner and outer race members 16 and 26, it should be understood that other suitable movement restricting means could also be employed. As is understood by those skilled in the art and by way of non-limiting example, snap rings (not shown) positioned adjacent one or more of the end faces 22, 24 and 32 and 34 could also be used.

To maintain desired spacing between the individual bearing elements and to provide proper guidance and retention of the bearing elements 40 within the bearing unit 10, the bearing unit 10 includes a bearing retainer or cage 56. As shown in FIGS. 1 and 2, the bearing cage 56 is of two-piece construction and includes separate first and second cage members 58 and 60. The cage members 58 and 60 are axially spaced apart in opposed relation to each other when in their operative, assembled positions in the bearing unit 10, and the cage members 58 and 60 act in conjunction with each other to appropriately position the bearing elements 40.

While in the illustrated arrangement the cage members 58 and 60 form halves of a two-piece bearing cage arrangement, it should be understood that the cage members 58 and 60 can also be used independently as one-piece bearing cages.

The first and second cage members 58 and 60 are preferably formed of molded plastic or polymeric material for economy and manufacturing ease, however, metal or other suitable materials could also be used. In the preferred embodiment, the cage members 58 and 60 are molded of fiber reinforced polyamide.

The first and second cage members 58 and 60 are preferably identically configured, and the same reference numerals are used to identify common components of the cage members 58 and 60. Only the first cage member 58 will be explained in detail.

As shown in FIGS. 6, 8 and 9, the first cage member 58 includes a ring-shaped cage body 62 and a plurality of body segments or webs 64 extending axially from one side thereof. The webs 64 are circumferentially spaced apart around the cage body 62, and each web 64 includes opposite arcuate surfaces 68 and 70 and inner and outer circumferential sides 72 and 74. The arcuate surfaces 68 and 70 of each web 64 are positioned in opposed relation to the arcuate surfaces of adjacent webs 64 to define pockets 66 (FIG. 4) for receiving the end portions of the bearing elements 40. The diameter of each pocket 66 is preferably slightly greater (approximately several one-thousandths of an inch greater) than the diameter of each of the bearing elements 40 and the pockets 66 are open at their outermost ends to facilitate insertion of the bearing elements 40.

At the termination of the arcuate surfaces 68 and 70 of each web 64, inner and outer retention surfaces 76 and 78 (see FIG. 7) are provided. The retention surfaces 76 and 78 of adjacent webs 64 cooperate to maintain the bearing elements 40 in position within the pockets 66, and the retention surfaces 76 and 78 are preferably sufficiently flexible to permit the bearing elements 40 to be snapped radially into the pockets 66, if desired.

The bearing cage 56 has versatility in that it can be used in variously sized bearing units. In particular, the axial distance between the spaced apart first and second cage members 58 and 60 can me varied to accommodate bearing units having bearing elements of different lengths without appreciably interfering with the performance of the bearing cage 56. If the cage members 58 and 60 are used individually as one-piece cages, the lengths of the webs 64 can be varied, if desired, to accommodate longer bearing elements 40.

The cage member 58 is also provided with flexible means for retaining the cage member 58 in its operative position within the bearing unit 10. While various flexible retaining means can be employed, in the illustrated arrangement such means includes resilient tab members 80. As shown in FIG. 7, each web 64 is provided with a pair of the tab members 80, and each of these tab members 80 angles radially outwardly from the free end of the associated web 64 and extends along the inner and outer circumferential surfaces 72 and 74 so that the tab members 80 terminate near, but radially spaced from, the ring 62. The tab members 80 are each flexible between a first or normal position (FIG. 2) in which the projecting ends of the tab members 80 are engageable with one of the shoulders 44, 46 and 48 to retain the cage member 58 in the bearing unit 10, and a radially inwardly flexed second position. In the second position, the tab members 80 are forced or flexed radially inwardly toward the associated web 64 to permit axial insertion of the webs 64 into the bearing unit 10.

To assemble the first cage member 58 in its operative position in the bearing unit 10, the cage member 58 is simply snapped into the raceway space 36 by pressing it in the axial direction through one of the constricted annular openings 50 and 52. As the first cage member 58 is pressed into the bearing unit 10, the tab members 80 thereon are caused to flex inwardly toward their associated webs 64 (i.e. their second positions) via engagement with one of the shoulders 44, 46 and 48. Once the tab members 80 clear the impinging one of the shoulders 44, 46 and 48, they snap back outwardly to their normal positions and the free ends of the tab members 80 engage the inner contact face of the opposed shoulder to thereafter retain the bearing cage member 58 in its operative position. Insertion of the second cage member 60 through the other of the opposite openings 50 and 52 is accomplished in a similar fashion.

Figure 11:
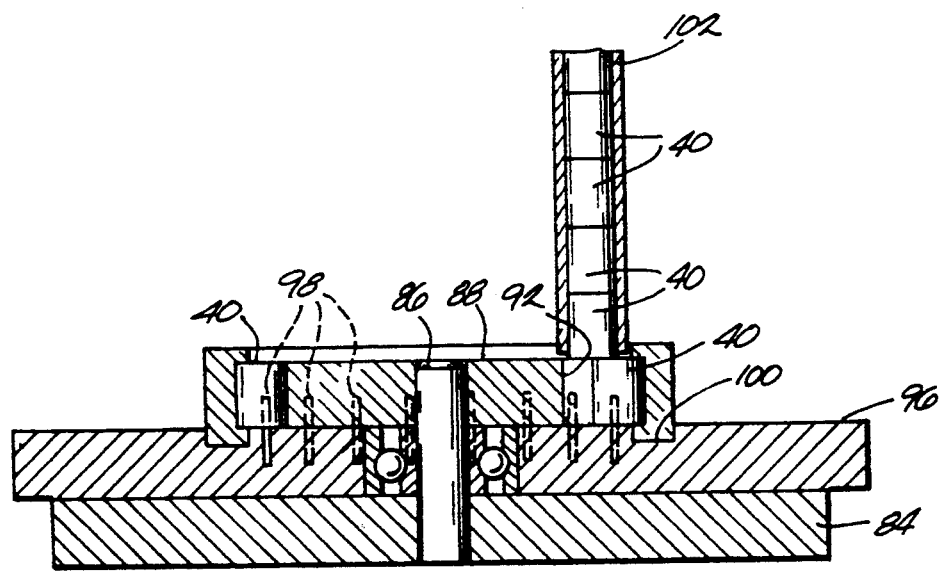
FIG. 11 is a partial sectional view of the assembly apparatus taken along line 11—11 in FIG. 10.

In a preferred method of assembly, the bearing unit 10 is constructed with the aid of an automated assembly apparatus 82 illustrated in FIGS. 10 and 11. The assembly apparatus 82 includes a base plate 84 (FIG. 11), a support post 86 fixed on one end to the base plate 84, and a generally cylindrical cam member 88 fixed on the other end of the support post 86. The cam member 88 includes an outer surface portion 90 (FIG. 10) generally corresponding to the inner race surface 20 of the inner race member 16 and a cam surface portion 92 forming an obtuse angle. The cam surface portion 92 partially defines a bearing element delivery area 94.

The assembly apparatus 82 also includes a pin fixture plate 96 including a plurality of locating pins 98 placed in a circular path which is coaxial with the support post 86 and an annular slot 100 coaxial with and located radially outwardly of the circular path of the pins 98. The fixture plate 96 is journaled on the support post 86 between the base plate 84 and the cam member 88. A bearing element delivery tube 102 is also provided to feed bearing elements 40 to the assembly apparatus 82.

To assemble the bearing unit 10 using the assembly apparatus 82, the outer race member 26 is placed on the fixture plate 96 so that one of the annular shoulders 46 and 48 is received in the annular slot 100. Thereafter, the fixture plate 92, which carries the outer race member 26, is rotated in the clockwise direction (FIG. 10) and bearing elements 40 are allowed to drop down into the delivery area 94 one at a time. As the fixture plate 96 is rotated, successive pins 98 engage the newly delivered bearing elements 40 causing each bearing element 40 to travel along the elongated portion of the cam surface portion 92 until it is cammed radially outwardly into position between a pair of the pins 98. When the appropriate number of bearing elements 40 have been sequentially positioned in appropriately spaced relation within the outer bearing race member 26, the delivery tube 102 is withdrawn and one of the cage members 58 and 60 is axially inserted into the annular space between the outer race member 26 and the cam member 88. To permit the installation of one of the cage members 58 and 60, the pins 98 extend only a limited distance from the fixture plate 96 so as not to interfere with insertion of the cage member. Thereafter, the partially assembled bearing unit 10 is removed from the assembly apparatus 82 and the inner race member 16 is positioned within the outer race member 26. As mentioned above, the single shoulder 44 on the inner race member 16 allows it to be easily assembled to the rest of the bearing unit 10. If the two-piece bearing arrangement is employed, the other of the cage members 58 and 60 can then be snapped into place.

Advantageously, the cage members 58 and 60 are capable of being individually snapped into position from the opposite sides of the bearing unit 10 to facilitate easy, automated assembly of the unit 10. Additionally, the bearing cage 56, whether employed as a two-piece or one-piece unit, is interchangeable in bearing units having different widths (i.e. bearing elements of various lengths) but including bearing elements with the common diameters. Further, since the cage members 58 and 60 are preferably identical, inventory required in bearing assembly manufacture or for maintaining existing bearing units is reduced. The use of identical cage members also decreases molding costs since only a single molding assembly is required.

Other features and advantages of the invention are set forth in the following claims.

We claim:

1. An anti-friction bearing assembly comprising:
   an annular inner bearing race member;
   an annular outer bearing race member positioned coaxially around the inner bearing race member, the inner and outer bearing race members defining therebetween an annular raceway space, the raceway space having opposite annular end openings;
   a plurality of bearing elements positioned within the raceway space; and
   means for supporting the plurality of bearing elements in spaced apart relation in the raceway space, the means for supporting including a bearing cage having a cage member which is axially insertable into the raceway space through one of the annular end openings, the cage member including an annular body portion, a plurality of axially extending webs spaced circumferentially around the annular body portion, the webs defining therebetween pockets for housing the bearing elements, each of the webs including an inner circumferential side, an outer circumferential side, and a free end portion, and the cage member further including flexible means for retaining the cage member within the raceway space, the flexible means including first and second opposite tab members extending radially and axially from each web, the first tab members extending from the inner circumferential side of respective webs, and the second tab members extending from the outer circumferential side of respective webs, each said tab member being flexible between a first position in which a space is defined between the tab member and the web from which it extends and in which the tab member is engageable with one of the inner and outer bearing race members, when the cage member is positioned within the raceway space, to prevent removal of the cage member from the raceway space, and a second position in which the tab member is flexed radially from the first position to permit insertion of the cage member through the one annular end opening.

2. An anti-friction bearing assembly as set forth in claim 1 wherein the bearing assembly further comprises a pair of axially spaced apart shoulder members each associated with one of the inner and outer bearing race members and extending radially toward the other of the inner and outer bearing race members, each of the shoulder members at least partially defining one of the annular end openings, wherein the bearing elements are confined between the shoulder members, the shoulder members limiting axial movement of the bearing elements relative to the bearing race member having associated therewith the shoulder members, wherein the bearing assembly further comprises a shoulder member on the other of the inner and outer bearing race members and extending radially toward one of the shoulder members which limits axial movement of the bearing elements, wherein the inner bearing race member is selectively axially slidable relative to said outer bearing race member for assembly and disassembly of the bearing assembly, wherein, when the cage member is being axially inserted through the one annular end opening, each of the tab members is engageable with one of the shoulder members and is flexed to the second position responsive to such engagement to permit insertion of the cage member through the one annular end opening, and wherein, following insertion of the cage member through the one annular end opening, each of the tab members snaps back to its first position and is engageable with one of the shoulder members to prevent removal of the cage member from the raceway space.

3. An anti-friction bearing assembly as set forth in claim 2 wherein the bearing cage includes a second cage member separate from the first mentioned cage member, the second cage member being axially insertable into the raceway space through the annular end opening opposite the one annular end opening to cooperate with the first mentioned cage member, while axially spaced apart from the first mentioned cage member, to circumferentially space the bearing elements apart, and the second cage member including an annular body portion, a plurality of axially extending webs spaced circumferentially around the body portion, the webs defining therebetween pockets for receiving the bearing elements, each of the webs of the second cage member including a pair of radially extending tab members each flexible between a first position in which said tab member is engageable with one of the shoulder members, when the second cage member is positioned within the raceway space, to prevent removal of the second cage member from the raceway space, and a second position in which said tab member is flexed radially from its first position to permit insertion of the second cage member through the annular end opening opposite the one annular end opening.

4. An anti-friction bearing assembly as set forth in claim 3 wherein the second cage member is axially spaced apart from the first mentioned cage member, and wherein each of the first mentioned and the second cage members are integral units.

5. An anti-friction bearing assembly as set forth in claim 1 wherein the bearing cage includes a second cage member which is axially insertable into the raceway space through the annular end opening opposite the one annular end opening to cooperate with the first mentioned cage member, while axially spaced apart from the first mentioned cage member, to circumferentially space the bearing elements apart, the second cage member including an annular body portion, a plurality of axially extending webs spaced circumferentially around the body portion, the webs on the second cage member defining therebetween pockets for receiving the bearing elements, and flexible means for retaining the second cage member within the raceway space, the flexible means of the second cage member including a tab member flexible between a first position in which said tab member of the second cage member is engageable with one of the inner and outer bearing race members, when the second cage member is positioned within the raceway space, to prevent removal of the second cage member from the raceway space, and a second position in which said tab member of the second cage member is flexed radially from its first position to permit insertion of the second cage member through the annular end opening opposite the one annular end opening.

6. An anti-friction bearing assembly as set forth in claim 5 wherein each of the webs of the first cage member corresponds to one of the webs on the second cage member, wherein each of the webs on each of the first and second cage members has a length in the axial direction, wherein each of the bearing elements is cylindrical and has a length in the axial direction, and wherein the combined lengths of each pair of corresponding webs is less than the length of each of the bearing elements.

7. An anti-friction bearing assembly as set forth in claim 1, wherein each of said webs further includes opposite arcuate surfaces, and wherein each of the pockets for housing the bearing elements are defined by one of the arcuate surfaces of one of the webs and one of the arcuate surfaces of an adjacent one of the webs.

* * * * *